(12) United States Patent
Min

(10) Patent No.: US 11,768,104 B2
(45) Date of Patent: Sep. 26, 2023

(54) OPTICAL SENSOR ASSEMBLY

(71) Applicant: ARCSOFT CORPORATION LIMITED, Zhejiang (CN)

(72) Inventor: Byung Il Min, Suwon-si (KR)

(73) Assignee: ARCSOFT CORPORATION LIMITED, Zhejiang (CN)

( * ) Notice: Subject to any disclaimer, the term of this patent is extended or adjusted under 35 U.S.C. 154(b) by 86 days.

(21) Appl. No.: 17/426,088

(22) PCT Filed: Jan. 23, 2020

(86) PCT No.: PCT/CN2020/074012
§ 371 (c)(1),
(2) Date: Jul. 27, 2021

(87) PCT Pub. No.: WO2020/156486
PCT Pub. Date: Aug. 6, 2020

(65) Prior Publication Data
US 2022/0090960 A1    Mar. 24, 2022

(30) Foreign Application Priority Data

Jan. 28, 2019 (KR) .................. 10-2019-0010548

(51) Int. Cl.
*G01J 1/42* (2006.01)
*G01J 1/04* (2006.01)
(Continued)

(52) U.S. Cl.
CPC ........... *G01J 1/4204* (2013.01); *G01J 1/0425* (2013.01); *G02B 6/4202* (2013.01); *G02B 6/43* (2013.01)

(58) Field of Classification Search
CPC .... G01J 1/4204; G01J 1/0425; G02B 6/4202; G02B 6/43
See application file for complete search history.

(56) References Cited

U.S. PATENT DOCUMENTS 5,636,303 A * 6/1997 Che ................. G02B 6/4249
385/33
2002/0160656 A1* 10/2002 Nishita ............ G02B 6/4246
439/577
(Continued)

FOREIGN PATENT DOCUMENTS

CN    1499454 A    5/2004
CN    2812161 Y    8/2006
(Continued)

OTHER PUBLICATIONS

Examination Report for corresponding KR application 10-2019-0010548 filed Jan. 18, 2019.
(Continued)

*Primary Examiner* — Georgia Y Epps
*Assistant Examiner* — Don J Williams
(74) *Attorney, Agent, or Firm* — Gang Yu

(57) ABSTRACT

The present disclosure relates to an optical sensor assembly. According to one aspect of the present disclosure, an embodiment of the optical sensor assembly is provided. The optical sensor assembly includes a plurality of optical fibers, wherein one ends of the plurality of optical fibers are configured in a row, and the other ends of the plurality of optical fibers are stacked in at least two rows, such that a width of a first surface formed by the one ends of the plurality of optical fibers is greater than a width of a second surface formed by the other ends of the plurality of optical fibers, and the optical sensor assembly further includes a sensor connector optically coupled with the second surface. And the sensor connector can be separated from the first surface and configured inside the electronic device.

18 Claims, 14 Drawing Sheets

(51) Int. Cl.
*G02B 6/42* (2006.01)
*G02B 6/43* (2006.01)

(56) References Cited

U.S. PATENT DOCUMENTS

| | | |
|---|---|---|
| 2004/0178329 A1 | 9/2004 | Kare et al. |
| 2006/0088258 A1 | 4/2006 | Sasaki et al. |
| 2006/0171251 A1 | 8/2006 | Busick |
| 2014/0099060 A1 | 4/2014 | Danley et al. |
| 2015/0028206 A1 | 1/2015 | Kim et al. |
| 2016/0076913 A1 | 3/2016 | Bonicci et al. |

FOREIGN PATENT DOCUMENTS

| | | |
|---|---|---|
| CN | 1914527 A | 2/2007 |
| CN | 103076659 A | 5/2013 |
| CN | 104347001 A | 2/2015 |
| CN | 104995538 A | 10/2015 |
| CN | 105634607 A | 6/2016 |
| CN | 109143473 A | 1/2019 |
| EP | 0240277 A2 | 10/1987 |
| JP | S6027557 U | 2/1985 |
| JP | S60192562 U | 12/1985 |
| JP | 2003087502 A | 3/2003 |
| JP | 2003247909 A | 9/2003 |
| JP | 2005160815 A | 6/2005 |
| JP | 2006351937 A | 12/2006 |
| JP | 2007513378 A | 5/2007 |
| JP | 4110250 B2 | 7/2008 |
| JP | 2012226342 A | 11/2012 |
| JP | 2016076913 A | 5/2016 |
| JP | 2018084539 A | 5/2018 |
| KR | 20060049368 A | 5/2006 |
| KR | 20180072285 A | 6/2018 |
| WO | 9115786 A1 | 10/1991 |

OTHER PUBLICATIONS

International Search Report for corresponding application PCT/CN2020/074012 filed Jan. 23, 2020; dated Apr. 24, 2020.

* cited by examiner

OPTICAL SENSOR ASSEMBLY

CROSS-REFERENCE TO RELATED APPLICATION

The disclosure claims the priority for Korean Patent Application No. 10-2019-0010548, applied on Jan. 28, 2019 and entitled "Optical Sensor Assembly", whose original description is incorporated herein as reference.

TECHNICAL FIELD

The present disclosure relates to an optical sensor.

BACKGROUND

Optical sensors are not only used in portable electronic devices such as mobile phones or tablets, but also in video electronic devices such as TVs or monitors. The optical sensors include, for example, illuminance sensors, proximity sensors, proximity illuminance sensors, etc., among which the proximity sensors are optical sensors for measuring distances between users and the electronic devices, the illuminance sensors are optical sensors for sensing brightness around the electronic devices, and the proximity illuminance sensors combining the optical proximity sensors and the optical illuminance sensors are provided with two sensors in single packages.

Recently, designs for displays occupying almost the entire fronts of the electronic devices have been increasing. According to the requirements for large screens, although the sizes of the displays become larger, at least parts of the fronts should still be guaranteed in order to configure cameras, especially the proximity illuminance sensors. The proximity sensors using ultrasonic waves, etc. can be used even in structures in which the fronts are covered with the displays, but illuminance sensing functions are difficult to integrate. In addition, although the illuminance sensors can be arranged in zones other than the fronts, they cannot sense ambient light due to cases for protecting the electronic devices. Therefore, although the most rational positions where the proximity illuminance sensors can be arranged are the fronts of the electronic devices, it is difficult to guarantee the positions where commonly used proximity illuminance sensors are arranged in the designs for the displays occupying the whole fronts.

SUMMARY

An objective of the present disclosure is to provide an optical sensor assembly. The optical sensor assembly is able to be applied to an electronic device with the following design: a display occupies a whole front.

An embodiment according to one aspect of the present disclosure provides an optical sensor assembly. The optical sensor assembly includes a plurality of optical fibers, wherein one ends of the plurality of optical fibers are configured in a row, and the other ends of the plurality of optical fibers are stacked in at least two rows, such that a width of a first surface formed by the one ends of the plurality of optical fibers is greater than a width of a second surface formed by the other ends of the plurality of optical fibers, and the optical sensor assembly further includes a sensor connector optically coupled with the second surface. The first surface receives light incident into an interior of an electronic device, and the light received by the first surface is transmitted to the sensor connector through the second surface, and the sensor connector is able to be separated from the first surface and configured inside the electronic device.

As an embodiment, the plurality of optical fibers are plastic optical fibers (POF).

As an embodiment, the plurality of optical fibers include a horizontal arrangement section, which configures the one ends of the plurality of optical fibers in a row; a vertical arrangement section, which configures the other ends of the plurality of optical fibers in at least two rows; and a deformation section, which connects the horizontal arrangement section and the vertical arrangement section and bends the plurality of optical fibers.

As an embodiment, in the second surface, the other ends of the optical fibers are stacked with a same number in each of the rows.

As an embodiment, in the second surface, the other ends of the optical fibers are stacked in at least two rows, and a number of the other ends of the fibers stacked in at least any one of the rows is different from a number of the other ends of the fibers stacked in each of the other rows.

As an embodiment, the second surface is provided with a plurality of regions.

As an embodiment, the first surface is configured in a space between a frame of the electronic device and a display panel.

As an embodiment, the sensor connector includes a male connector, which is used for the other ends of the plurality of optical fibers to be inserted and fixed inwards; a female connector, which is used for accommodating the male connector inside; and an optical sensor, which is coupled with the female connector in a direction towards the male connector.

As an embodiment, the optical sensor includes a substrate, a side of the substrate is arranged a plurality of cut-off through holes; an optical sensor chip die, which is configured on the substrate and electrically connected with the plurality of cut-off through holes; and a light-emitting diode, which is configured on the substrate and separated from the optical sensor chip die and electrically connected with the plurality of cut-off through holes.

As an embodiment, the female connector further includes a separation wall for optically separating the optical sensor chip die and the light-emitting diode.

As an embodiment, the male connector further includes a separation wall for optically separating the optical sensor chip die and the light-emitting diode.

As an embodiment, the optical sensor further includes a lens for the optical sensor arranged above the optical sensor chip die.

As an embodiment, the optical sensor assembly further includes a flat connector, the flat connector accommodates the one ends of the plurality of optical fibers inside, the flat connector is capable of providing a light path, and the light path causes the light incident into the interior of the electronic device to travel towards the one ends.

As an embodiment, the flat connector includes a cover, which is internally provided with a hemispherical groove, the hemispherical groove accommodates at least a part of the optical fibers; and a support body, which is provided with the plurality of optical fibers and fastened to the cover, so as to fix the plurality of optical fibers.

As an embodiment, the optical sensor assembly further includes a mirror, the mirror is configured obliquely with respect to the plurality of optical fibers and the light path separately.

As an embodiment, the one ends of the plurality of optical fibers are inclined planes.

As an embodiment, the optical sensor assembly further includes a vertical light guide plate, the vertical light guide plate is configured in the light path, so as to optically couple with the one ends of the plurality of optical fibers, and inclined planes are configured opposite the one ends of the optical fibers.

As an embodiment, the optical sensor assembly further includes a thermal insulation component, the thermal insulation component protects the plurality of optical fibers.

As an embodiment, the plurality of optical fibers include an optical fiber for light emission, which transmits detection light to an outside; and an optical fiber for light reception, which transmits reflected detection light incident from the outside, wherein the optical fiber for light emission and the optical fiber for light reception are configured separately.

The optical sensor assembly according to an embodiment of the present disclosure is able to be applied to an electronic device with the following design: a display occupies a whole front. Although the optical sensor assembly is configured inside the electronic device, the optical sensor assembly can transmit external light to the optical sensor, such that a degree of freedom of design of the electronic device is be enhanced. In addition, the optical sensor assembly won't be affected by light emitted from the interior of the electronic device.

BRIEF DESCRIPTION OF THE DRAWINGS

The following describes the present disclosure with reference to embodiments shown in accompanying drawings. In order to facilitate understanding, reference numerals are configured for identical constituent elements throughout all the accompanying drawings. Structures shown in the accompanying drawings are merely exemplarily implemented for describing the present disclosure, and the scope of the present disclosure is not limited thereto. Especially, in order to facilitate the understanding of the disclosure, the accompanying drawings show partial constituent elements in a slightly exaggerated form. The accompanying drawings are ways to understand the disclosure, so it should be understood that widths or thicknesses of the constituent elements shown in the accompanying drawings may be different from those in actual implementation.

DETAILED DESCRIPTION OF THE EMBODIMENTS

Figure 1:
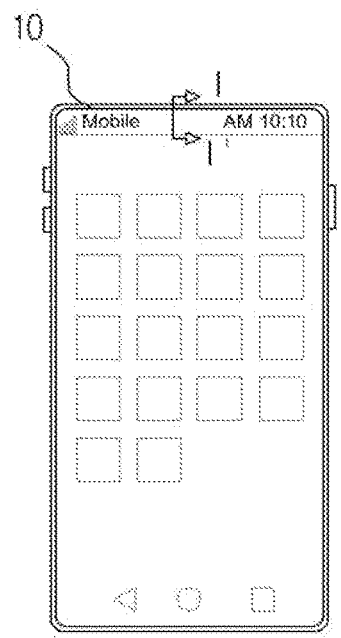
FIG. 1 (*a*) to FIG. 1 (*c*) are diagrams exemplarily showing an optical sensor assembly arranged in an electronic device.
Figure 1:
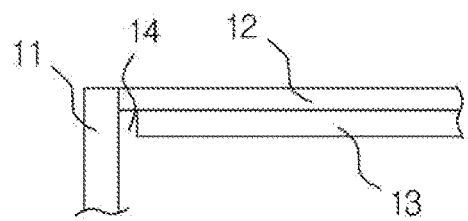
Figure 1:
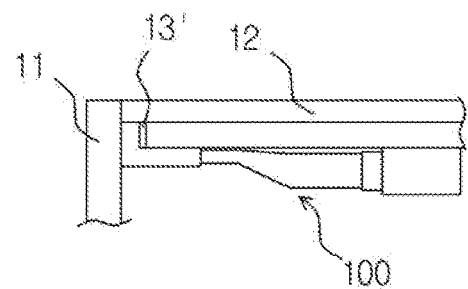

The present disclosure is capable of being subjected to various modifications and having various embodiments, and particular embodiments, shown in the accompanying drawings, are intended to describe the present disclosure in detail. However, it should be understood that the present disclosure is not intended to be limited to the forms of particular implementation, but includes all modifications, equivalents and even alternatives included in ideas and the technical scope of the present disclosure. Especially, the functions, features and embodiments described below with reference to the accompanying drawings may be implemented alone or in combination with other embodiments. Therefore, it should be noted that the scope of the present disclosure is not limited to the forms shown in the accompanying drawings.

In addition, expressions like "actually", "almost", "about", etc. in terms used in the specification consider surpluses applied in actual implementation or possible errors. For example, "actually 90 degrees" should be understood as follows: an angle equivalent to 90 degrees in effect. As another example, "almost nonexistent" should be understood as follows: even if something exists hardly, it can be ignored.

In addition, unless specifically mentioned, "side" or "horizontal" refers to left and right directions of the accompanying drawings, and "vertical" refers to up and down directions of the accompanying drawings. In addition, unless specifically defined, angles, incident angles, etc. are based on virtual straight lines perpendicular to horizontal planes shown in the accompanying drawings.

Throughout all the accompanying drawings, the identical or similar elements use and refer to identical reference numerals.

FIG. 1 (*a*) to FIG. 1 (*c*) are diagrams exemplarily showing an optical sensor assembly arranged in an electronic device.

The optical sensor assembly 100 eliminates a design limitation on an optical sensor that must be arranged on a front of the electronic device 10 such as a smart phone. The optical sensor assembly 100 is arranged at an interior of the electronic device 10, and the optical sensor included in the optical sensor assembly 100 won't be affected by a light-emitting component inside the electronic device 10, such as a display panel 13. Even if not exposed to an exterior, the optical sensor can perform an original function through the optical sensor assembly 100. In other words, on account of the optical sensor assembly 100, it is not necessary to configure the optical sensor in a zone of a part of the front of the electronic device 10, so the display panel 13 can be arranged in a whole zone of the front.

The optical sensor arranged in the electronic device 10 has a light reception portion such as a photodiode, and the light reception portion is arranged below an optically transparent cover glass 12. Light transmitted through the cover glass 12 reaches the light reception portion through an opening formed on a top of the optical sensor, and is detected through the light reception portion. Like most other electronic components, the optical sensor has a very small dimension as well. However, in order to configure the optical sensor blow the cover glass 12, a space is required between a frame 11 of the electronic device 10 and a display 13, which results in reduction in area occupied by the display 13.

FIG. 1 (*a*) is an electronic device provided with a front display, and FIG. 1 (*b*) is a sectional view along line "I-I". When observed with naked eyes, although it looks as if the display 13 is closely attached to the frame 11, there is a clearance of tens or even hundreds of ums between the display 13 and the frame 11. In addition, a groove is formed on a part of a side of the display 13, or a part of the side is concavely formed. Light can be incident through the clearance or the space 14, and the clearance is provided on account of a design considering a tolerance, and the space is formed on account of a side structure of the display 13. However, the space 14 is too narrow to accommodate an optical sensor of a general structure.

FIG. 1 (*c*) shows the optical sensor assembly 100 configured in the space 14 between the frame 11 and the display 13. One end of the optical sensor assembly 100 is thin so as to be arranged in the space 14, and the other end is provided with an area which covers at least a part of the top of the optical sensor. The optical sensor assembly 100, through the cover glass 12, transmits light incident into the space 14 to the optical sensor. The optical sensor can detect brightness around the electronic device, and a distance between the electronic device and a surrounding object, and/or whether there are objects around the electronic device through the transmitted light. In addition, a side of the display panel 13 can also transmit light. Particularly, light emitted from the display panel 13 may affect the optical sensor assembly 100. Therefore, the side of the display panel 13 is formed or provided with a light shielding structure 13'. The light shielding structure 13' is, for example, a light shielding substance stacked on the side of the display panel 13. The light shielding structure 13' is formed on a whole side of the optical sensor assembly 100, or merely formed on a part of the side of the optical sensor assembly 100. In addition, the light shielding structure formed on the side extends along a screen of the display panel.

Figure 2:
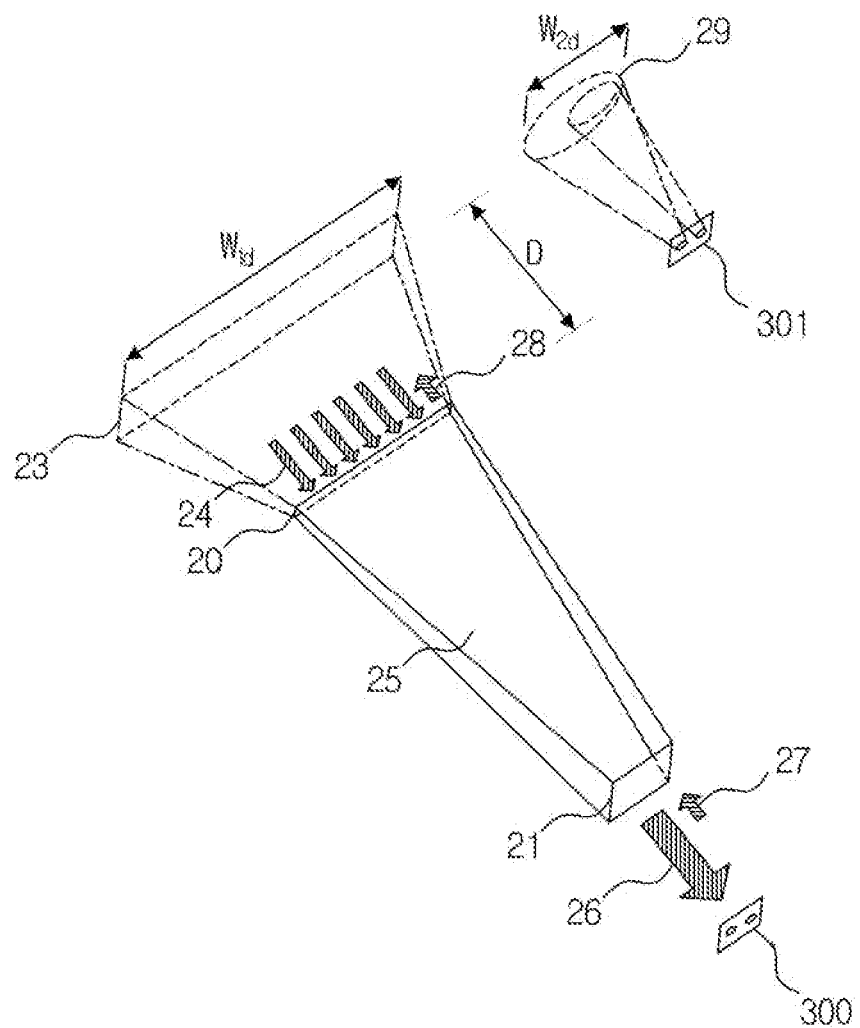
FIG. 2 is a diagram exemplarily describing an operation principle of the optical sensor assembly.

FIG. 2 is a diagram exemplarily describing an operation principle of the optical sensor assembly, and shows an operation principle of a general optical sensor 301 at the same time for comparison.

The optical sensor assembly 100 includes a light guide plate 25, the light guide plate 25 having a first surface 20 on which light 24 is incident and a second surface 21 from which light 26 is emitted. The first surface 20 and the second surface 21 have different shapes. As shown, the first surface 20 is a thin and long rectangle, and the second surface 21 is a square. However, although detailed description will be given below, shapes of the first surface 20 and the second surface 21 are not limited to the rectangular or square as shown. In addition, an area of the first surface 20 and an area of the second surface 21 are actually identical. In other words, if light loss caused by the light guide plate 25 is extremely tiny, brightness of light 24 received by the first surface 20 and brightness of light 26 reaching the optical sensor 300 through the second surface 21 are actually identical.

A lateral length (or width) of the first surface 20 is greater than a lateral length of the second surface 21, and a longitudinal length (or thickness) of the first surface 20 is smaller than a longitudinal length of the second surface 21. The first surface 20 can receive light 24 incident at a specified angle range. Therefore, a detection zone 23 corresponding to the first surface 20 expands with increase of a distance D from the first surface 20, and a shape of the detection area 23 is kept almost similar to a shape of the first surface 20.

Similar to the first surface 20, in the case of the optical sensor 301, a detection range 29 expands accordingly as the above distance D increases. A shape of the detection range 29 of the optical sensor 301 is determined according to an optical structure of the optical sensor 301, for example, a shape of a lens and/or an opening for light transmission, and can be actually circular or elliptical. A width $W1d$ of the detection zone 23 of the first surface 20 is relatively greater than a width $W2d$ of the detection zone 29 of the optical sensor 301 since the lateral length of the first surface 20 is relatively greater than a width of the optical structure of the optical sensor 301.

In addition, the light guide plate 25 transmits light in two directions. The second surface 21 can receive light 27 generated by the optical sensor 300. Light 28 emitted to an exterior of the light guide plate 25 through the first surface 20 can be reflected by an object and return to the first surface 20 again. In order to reduce interference among light, a light path through which the light 24, received by the first surface 20, passes are separated from a light path through which the light 27, received by the second surface 21, passes. Herein, the light 27 received by the second surface 21 can be, for example, light with a specific wavelength similar to near infrared rays and/or a pulse shape with a predetermined frequency.

The light guide plate 25 can be variously implemented. Although the following description focuses on an embodiment in which the light guide plate 25 is formed by using a plurality of plastic optical fibers (POF), the light guide plate 25 can also be manufactured in the following way, namely through injection molding with a material having properties similar to those of a POF core and a mold. In addition, the light guide plate 25 can also be manufactured by using a glass optical fiber (GOF) or a substance having properties similar to those of the GOF core. However, in the case of GOF, a shape of an optical fiber should be formed in accordance with a shape of the light guide plate 25 through heat treatment, etc.

Figure 3:
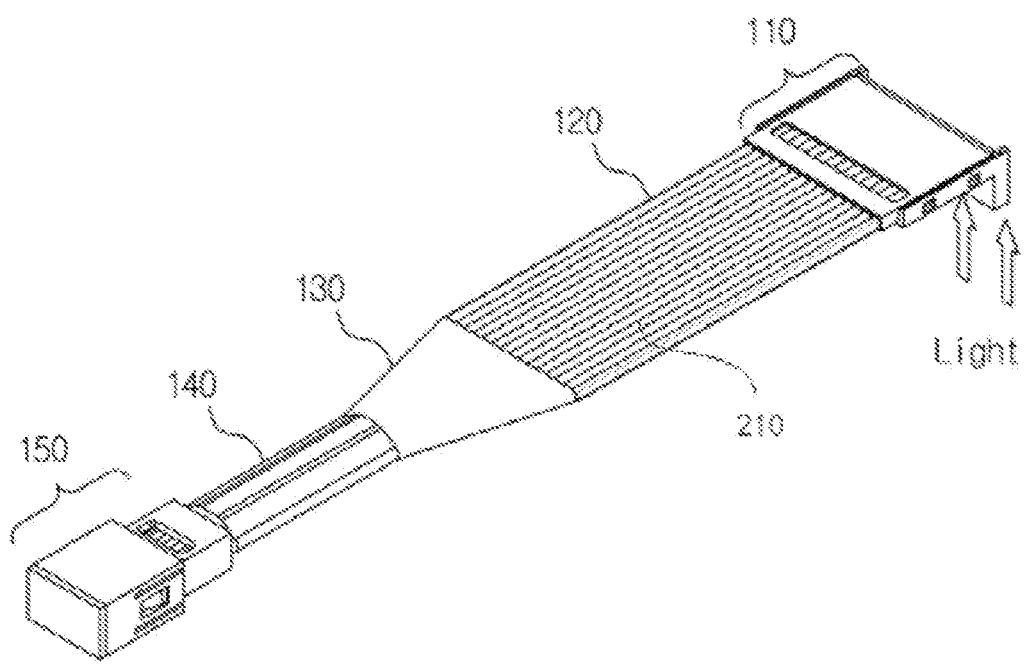
FIG. 3 is a diagram exemplarily describing an embodiment of the optical sensor assembly implementing the operation principle of FIG. 2.
Figure 4:
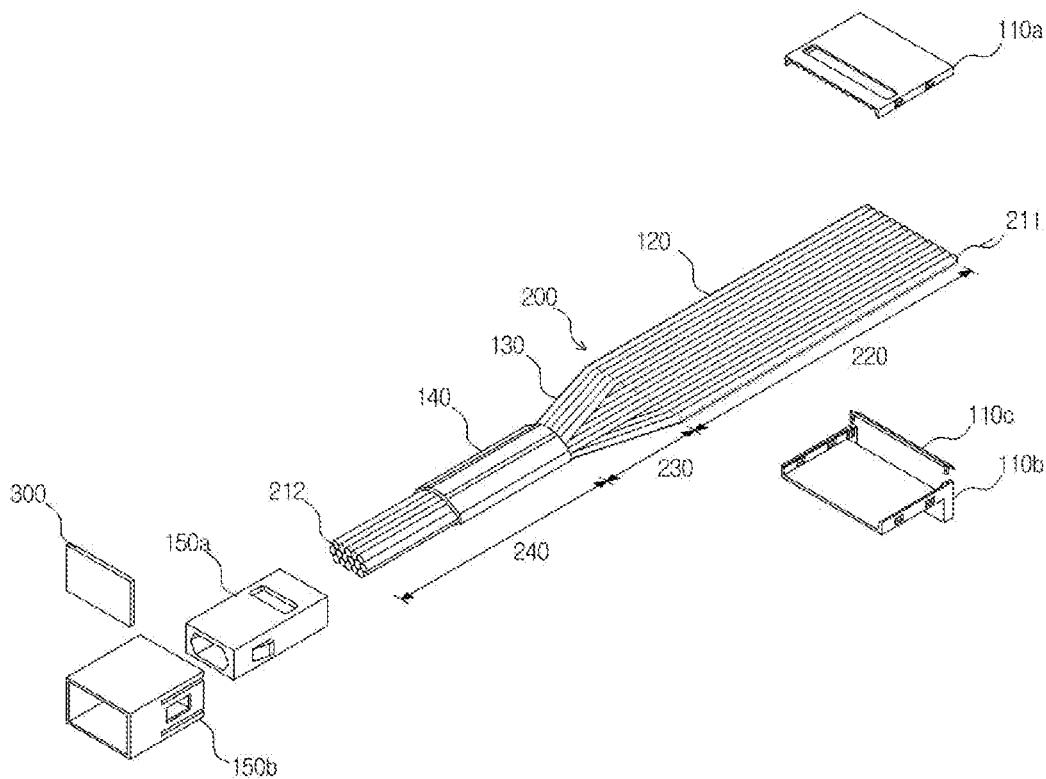
FIG. 4 is an exploded perspective view of the optical sensor assembly in FIG. 3.

FIG. 3 is a diagram exemplarily describing an embodiment of the optical sensor assembly implementing the operation principle of FIG. 2, and FIG. 4 is an exploded perspective view of the optical sensor assembly of FIG. 3.

With reference to FIG. 3 and FIG. 4, the optical sensor assembly 100 includes a sensor connector 150 and a light guide plate 200. And optionally, the optical sensor assembly 100 further includes a flat connector 110. The flat connector 110 is combined with one end of the light guide plate 200, and the sensor connector 150 is combined with the other end of the light guide plate 200. As an embodiment, the light guide plate 200 is composed of a plurality of optical fibers 210. The optical fiber 210 includes core capable of transmitting light inside and coatings for protecting the cores, and diameters of the cores and thicknesses of the coatings can be varied. In addition, the optical fibers 210 have appropriate flexibility, and at least a part of a section of the light guide plate 200, for example, a horizontal arrangement section 220, can be bent. The optical fibers 210, for example, can be POF.

The light guide plate 200 includes the horizontal arrangement section 220, a deformation section 230 and a vertical arrangement section 240. The horizontal arrangement section 220, the deformation section 230 and the vertical arrangement section 240 are used to distinguish an arrangement state (for example, the horizontal arrangement section 220 and the vertical arrangement section 240) and/or a zone where the arrangement state changes (for example, the deformation section 230) of the optical fibers 210, and the sections 220, 230 and 240 are sequentially continuous. Lengths of the sections 220, 230, and 240 can be identical or different. In addition, widths of the sections 220, 230, and 240 decrease in sequence.

As an embodiment, in the horizontal arrangement section 220, the plurality of optical fibers 210 are configured in a row. Herein, for one row, when viewed in a length direction, it means that the plurality of optical fibers 210 are arranged on an identical plane. In addition, for one ends 211 of the plurality of optical fibers 210, the one ends are actually arranged on an identical plane when viewed in a sectional direction, such that the first surface 20 shown in FIG. 2 is formed. In the horizontal arrangement section 220, although the optical fibers 210 are actually in a straight line in the length direction, at least a part of the optical fibers 210 can be curves or bent by an external force on account of proper flexibility thereof. A general optical sensor 301, for example, should directly be in contact with the cover glass 12 or at least be located below the cover glass 12. On the contrary, the optical sensor 300 included in the optical sensor assembly 100 is located at a position where light cannot reach, but can receive light through the light guide plate 200. Especially, the bendable horizontal arrangement section 220 can more freely determine an arrangement position of the optical sensor 300. As another example, in the horizontal arrangement section 220, the plurality of optical fibers 210 are configured in at least two rows. In other words, when viewed in the length direction, it means that at least a part of the plurality of optical fibers 210 are arranged on a plane different from the plane where the remaining optical fibers 210 are arranged. However, even in this structure, the one ends 211 of the plurality of optical fibers 210 are arranged on the actually identical plane.

The deformation section 230 is located between a position of an end of the horizontal arrangement section 220 and a section of a beginning of the vertical arrangement section 240, and actually serves as a section where the straight optical fibers 210 are curved or bent. The deformation section 230 is, for example, a section used for stacking the plurality of optical fibers 210, arranged in a row, in at least two rows and therefore used for deforming the optical fibers 210. On account of the deformation section 230, respective shapes of the plurality of optical fibers can be different from one another or symmetrical.

The vertical arrangement section 240 is a section extending from the deformation section 230, in which the plurality of optical fibers 210 are stacked in at least two rows. A number of the optical fibers 210 stacked in each row of the vertical arrangement section 240 can be identical or different. For example, when the light guide plate 200 is composed of 16 optical fibers 210, the optical fibers can be stacked in two rows with eight optical fibers each row, in four rows with four optical fibers each row, or in eight rows with two optical fibers each row. The 16 optical fibers 210 can also be stacked in three rows with 5-6-5 optical fibers each row (an upper row-a middle row-a lower row). In addition, for example, when the light guide plate 200 is composed of 15 optical fibers 210, the optical fibers can be stacked in five rows with 1-2-3-4-5 optical fibers each row, the number of optical fibers 210 stacked in any row can be different from the number of optical fibers 210 stacked in other row. Regardless of the number of optical fibers 210 stacked in each row, the other ends 212 of the optical fibers 210 are actually arranged on the identical plane when viewed in the sectional direction, such that the second surface 21 shown in FIG. 2 is formed. In addition, in the vertical arrangement section 240, the optical fibers 210 can be actually straight lines. Ends, namely the second surface 21, of the vertical arrangement section 240, can be actually optically coupled with the optical sensor 300 vertically. Herein, optical coupling refers to a state in which two constituent elements can transmit light to each other, and is not limited to a state in which constituent portions are in physical contact. On the contrary, optical separation refers to a state in which two constituent elements cannot transmit light to each other.

As an embodiment, the length of the horizontal arrangement section 220 is longer than the lengths of the remaining sections 230 and 240. The horizontal arrangement section 220 enables the plurality of optical fibers 210 to be arranged in a row, which is more flexible than the remaining sections 230 and 240. Especially, a sectional thickness of the horizontal arrangement section 220 is thinner than sectional thicknesses of the remaining sections 230 and 240, such that the horizontal arrangement section can be inserted in a relatively narrow section 14 between the frame 11 and the display 13, for example. If the horizontal arrangement section 220 is long enough, even if a part of the horizontal arrangement section 220 is inserted into the relatively narrow section 14, the remaining part of the horizontal arrangement section can be bent, so it is easy to configure the optical sensor 300 at an appropriate position. As other embodiments, the length of the vertical arrangement section 240 can be longer than the lengths of the remaining sections 220 and 230.

As an embodiment, a first thermal insulation component 120 for maintaining and/or protecting an arrangement state of the plurality of optical fibers 210 is formed in at least a part of the horizontal arrangement section 220. The first thermal insulation component 120 is formed by coating the plurality of optical fibers 210 with a substance with relatively low thermal conductivity. As another embodiment, the first thermal insulation component 120 can be a protective film, the protective film being attached to at least a part of the horizontal arrangement section 220, thereby maintaining the arrangement state of the plurality of optical fibers 210. As another embodiment, when the horizontal arrangement section 220 is bent, in order to maintain the state of the horizontal arrangement section 220, the substance which coats at least a part of the horizontal arrangement section 220 maintains a certain shape and has relatively low thermal conductivity even after cured. Moreover, constituent portions except for the plurality of optical fibers 210, for example, a funnel 130, a sensor connector 150, etc., can also be formed from a substance with relatively low thermal conductivity.

As an embodiment, the funnel 130 for protecting the plurality of optical fibers 210 is configured in the deformation section 230. The funnel 130 is provided with a horizontal arrangement section side inlet and a vertical arrangement section side inlet. The funnel 130 has the following shape: a left-right width decreases and a height increases from the horizontal arrangement section side inlet to the vertical arrangement section side inlet. A left-right width of the horizontal arrangement section side inlet is actually equal to or greater than a sum of diameters of the plurality of optical fibers 210, and a height of the horizontal arrangement section side inlet is actually equal to or greater than the diameters of the optical fibers 210. A shape of the vertical arrangement section side inlet is determined by a sectional shape of the plurality of optical fibers 210 located in the vertical arrangement section 240. For example, the funnel 130 can be of a funnel shape with a flat inlet (namely the vertical arrangement section side inlet). Therefore, if the plurality of horizontally arranged optical fibers 210 are inserted through the horizontal arrangement section side inlet, the plurality of optical fibers 210 are vertically arranged while being led out of the vertical arrangement section side inlet. On the contrary, if the plurality of vertically arranged optical fibers 210 are inserted through the vertical arrangement section side inlet, the plurality of optical fibers 210 are horizontally arranged while being led out of the horizontal arrangement section side inlet. The funnel 130 can be formed from synthetic resin, etc.

As an embodiment, a second thermal insulation component 140 for maintaining and/or protecting an arrangement state of the plurality of optical fibers 210 is formed in at least a part of the vertical arrangement section 240. The second thermal insulation component 140 is formed by coating the plurality of optical fibers 210 with a substance with relatively low thermal conductivity. A sectional shape of the second thermal insulation component 140 is determined by the sectional shape of the plurality of optical fibers 210 located in the vertical arrangement section 240. As an embodiment, the second thermal insulation component 140 is formed by coating at least a part of the vertical arrangement section 240 with synthetic resin. As another example, the second thermal insulation component 140 is a pipe formed from synthetic resin. As another example, the second thermal insulation component 140 and the funnel 130 is integrally formed. In other words, the second thermal insulation component 140 extends from the vertical arrangement section side inlet of the funnel 130 to a length direction of the optical fibers 210.

The sensor connector 150 includes a male connector 150a and a female connector 150b. The male connector 150a is combined with the vertical arrangement section 240. In other words, the other ends 212 of the plurality of optical fibers 210 are inserted into the male connector 150a. The female connector 150b is attached to the interior of the electronic device 10, for example, a substrate, etc. and accommodates the male connector 150a in an internal space of the female connector 150b. The optical sensor 300 is combined with the female connector 150b. The male connector 150a is inserted into the female connector 150b, such that the other ends 212 of the plurality of optical fibers 210 are optically coupled with the optical sensor 300.

Furthermore, the optical sensor assembly 100 further includes the flat connector 110. The flat connector 110 is combined with the horizontal arrangement section 220. In other words, the one ends 211 of the plurality of optical fibers 210 are configured on the flat connector 110. The flat connector 110 includes a cover 110a and a support body 110b, and the flat connector 110 further includes a mirror 110c. In other words, a part of the plurality of optical fibers 210 are configured on the support body 110b, and are fixed through the cover 110a combined with the support 110b. The one ends 211 of the plurality of optical fibers 210 are arranged towards the mirror 110c. The flat connector 110 is configured in the space 14 between the frame 11 and the display 13.

Figure 5:
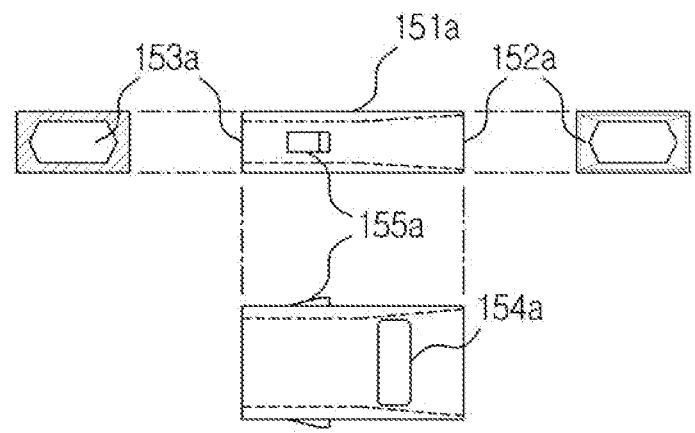
FIG. 5 (*a*) to FIG. 5 (*c*) are diagrams exemplarily showing an embodiment of a sensor connector of the optical sensor assembly.
Figure 5:
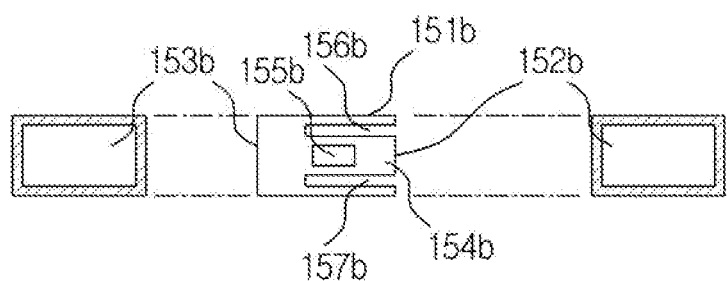
Figure 5:
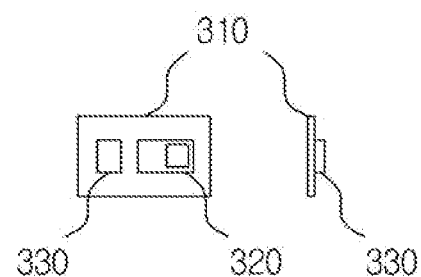

FIG. 5 (a) to FIG. 5 (c) are diagrams exemplarily showing an embodiment of the sensor connector of the optical sensor assembly, FIG. 5 (a) represents a front, a side, a rear and a top of the male connector 150a, FIG. 5 (b) represents a front, a side and a rear of the female connector 150b, and FIG. 5 (c) represents a top and a side of the optical sensor 300.

The male connector 150a includes a male connector body 151a, the male connector body 151a is provided with an insertion port 152a of the plurality of optical fibers 210 at the rear and an exposure port 153a at the front. An opening 154a that exposes outwards at least a part of the plurality of optical fibers 210 inserted into the male connector 150a externally is formed on the top of the male connector body 151a. A fastening bulge 155a fastened to the female connector 150b is formed on one or each of left and right sides of the male connector body 151a.

The insertion port 152a of the male connector body 151a is formed relatively greater than the exposure port 153a. A left-right width of the insertion port 152a is greater than a left-right width of the exposure port 153a, and/or a height of the insertion port 152a is greater than a height of the exposure port 153a. In other words, an area of the insertion port 152a is greater than an area of the exposure port 153a. If the insertion port 152a is formed greater than a cross section of the vertical arrangement section 240 of the plurality of optical fibers 210, the plurality of optical fibers 210 can be easy to insert into the male connector 150a. Although a shape of the exposure port 153a is actually identical to a shape of a cross section of the vertical arrangement section 240, a shape of the insertion port 152a may not be limited by the shape of the cross section of the vertical arrangement section 240.

The female connector 150b includes a female connector body 151b, the female connector body 151b is provided with an insertion port 152b for inserting the male connector 150a at the rear, and an exposure port 153b for fastening the optical sensor 300 at the front. A fastening groove 155b for accommodating the fastening bulge 155a is formed at a side of the female connector body 151b. On the side 154b of the female connector body 151b, horizontal grooves 156b and 157b extending horizontally from the insertion port 152b to cross the fastening groove 155b are formed above and below the fastening groove 155b respectively. When the male connector 150a is inserted, the horizontal grooves 156b and 157b enable the side 154b of the female connector body 151b to bend outwards, such that fastening of the male connector 150a and the female connector 150b is achieved.

The optical sensor 300 includes a substrate 310 and an optical sensor chip die 320, and can further optionally include a light-emitting diode 330. The optical sensor chip die 320 can be an illuminance sensor chip die, a proximity sensor chip die, or a proximity illuminance sensor chip die. The light-emitting diode 330 can irradiate detection light of visible light, near infrared or ultraviolet wavelengths. The proximity sensor chip die or the proximity illumination sensor chip die receives detection light reflected by an object, such that a detection signal can be generated, which is necessary for judging whether any object gets close to the electronic device. The optical sensor 300 enables a surface, to which the chip die is attached, of two surfaces of the substrate to be directed towards the exposure port 153b, so as to be combined with the female connector 150b.

Figure 6:
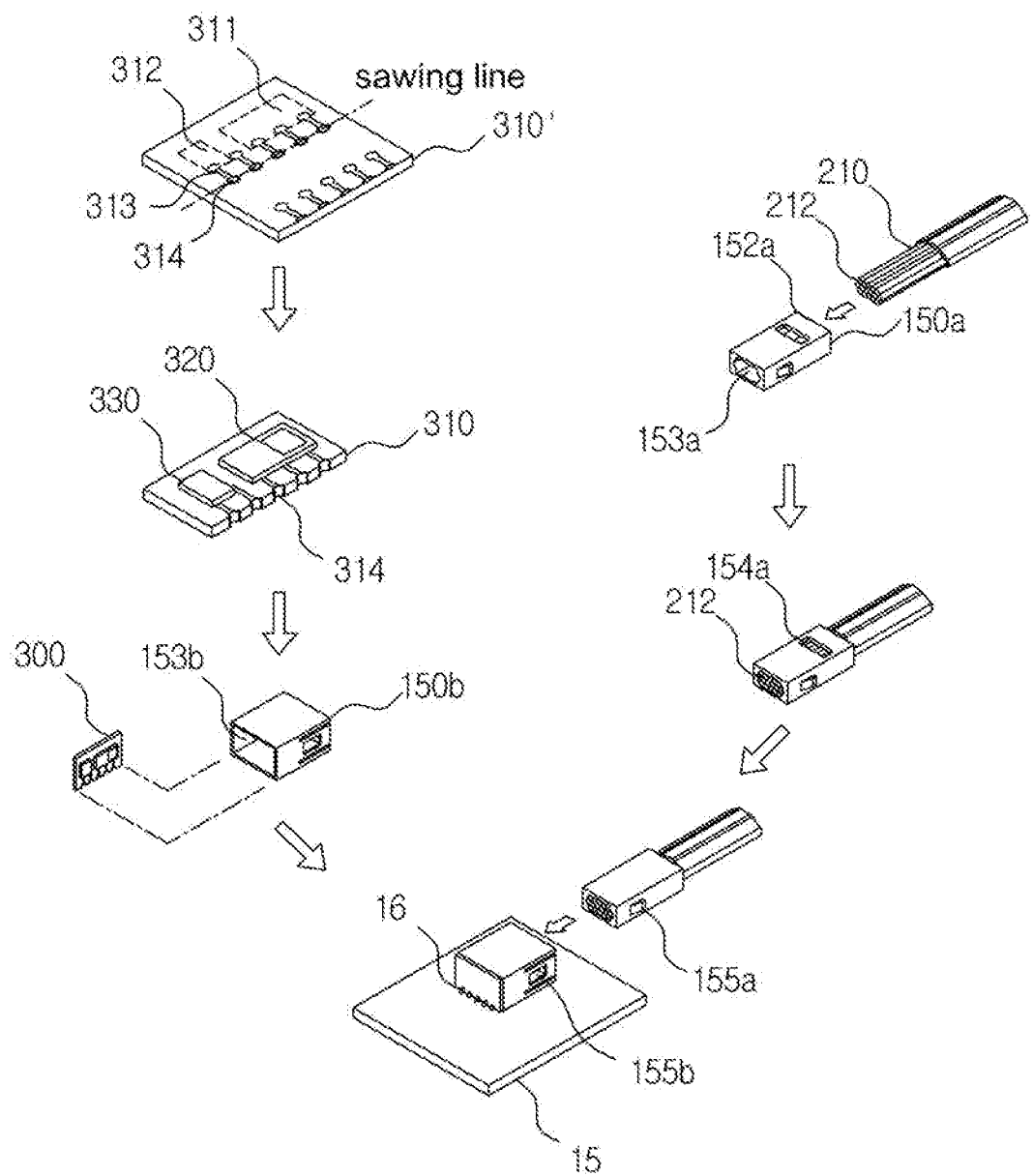
FIG. 6 is a diagram exemplarily showing manufacturing and arrangement processes of the sensor connector of the optical sensor assembly.

FIG. 6 is a diagram exemplarily showing manufacturing and arrangement processes of the sensor connector of the optical sensor assembly.

The sensor connector 150 optically couples the plurality of optical fibers 210 with the optical sensor 300. The female connector 150b is surface-mounted on the substrate 15 inside the electronic device 10, and the optical sensor 300 can be electrically connected to the substrate 15 in a state of being combined with the female connector 150b. The male connector 150a is inserted and fastened into the female connector 150b in a state of being combined with the plurality of optical fibers 210, such that the other ends 212 of the optical fibers 210 are directed towards the optical sensor 300. Light passing through the other ends of the optical fibers 210 is directed towards the optical sensor 300, and light generated by the optical sensor 300 is transmitted to the optical fibers 210 through the other ends 212.

The optical sensor 300 is manufactured by being electrically combined with the optical sensor chip die 320 and/or the light-emitting diode 330 on the substrate 310' with a printed conductive path 313 or the substrate 310 obtained by performing transmission on the printed conductive path. The conductive path 313 is printed on either or each surface of two surfaces of the substrate 310', and is connected to a plurality of conductive through holes 314 penetrating the substrate 310'. The conductive path 313 is provided with one end near a position to which the optical sensor chip die 320 and/or the light-emitting diode 330 is attached, and the other end of the conductive path 313 is electrically connected to the conductive through holes 314. Herein, the one end of the conductive path 313 is located at a position that the conductive path can be electrically connected to a contact pad of the optical sensor chip die 320 and/or the light-emitting diode 330 through a wiring.

The substrate 310 of the optical sensor 300 is manufactured by cutting off the substrate 310' along the plurality of conductive through holes 314. The plurality of conductive through holes 314 are actually formed to be arranged on an identical straight line. A conductive substance is evaporated on at least a part, for example, an inner side, of an interior of the conductive through holes 314, for example, metal plating. If the conductive through holes 314 are cut off in such a way that a part of the conductive through holes 314 remains, the optical sensor 300 is vertically combined with the substrate 15 of the electronic device 10 by utilizing the cut-off through holes 314.

The optical sensor 300 is combined with the exposure port 153b of the female connector 150b and then attached to the substrate 15. Conductive contacts are configured on a position, corresponding to the conductive through holes 314, of the substrate 15. The conductive through holes 314 can be electrically connected to the conductive contacts, for example, through welding.

In addition, the other ends 212 of the plurality of optical fibers 210 are inserted into the insertion port 152a of the male connector 150a, such that at least a part of the optical fibers are exposed out of the male connector 150a through the exposure port 153a. The optical fibers 210 with the other ends 212 exposed are cut off in a vertical direction, such that the other ends 212 of the plurality of optical fibers 21 are located on an actually identical plane.

After the plurality of optical fibers 210 are configured inside the male connector 150a, or after the exposed optical fibers 210 are vertically cut off, in order to fix the plurality of optical fibers 210, synthetic resin, for example, photo-curable epoxy resin, etc. is injected into the male connector 150a through the opening 154a. After the synthetic resin is cured, the male connector 150a is inserted into the female connector 150b. The fastening bulge 155a of the male connector 150a is accommodated in the fastening groove 155b of the female connector 150b, such that the optical sensor 300 is optically coupled with the plurality of optical fibers 210.

Figure 7:
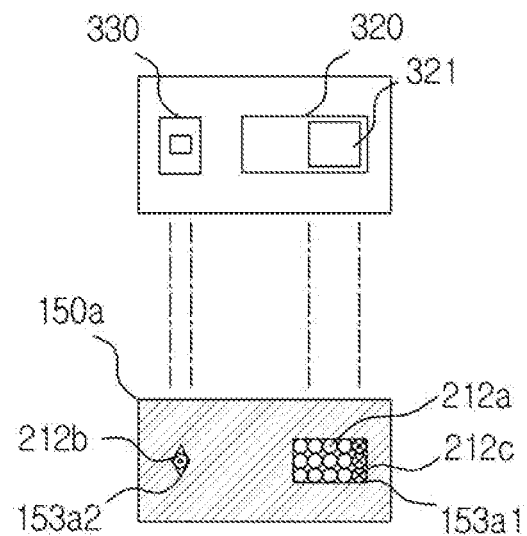
FIG. 7 (*a*) and FIG. 7 (*b*) are diagrams exemplarily showing another embodiment of the sensor connector of the optical sensor assembly.
Figure 7:
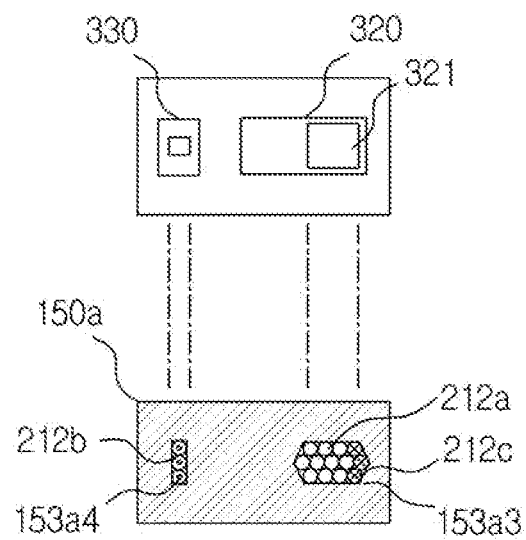

FIG. 7 (a) and FIG. 7 (b) are diagrams exemplarily showing another embodiment of the sensor connector of the optical sensor assembly.

The optical sensor chip die 320 included in the optical sensor 300 includes a light reception portion 321, which detects light transmitted to the optical fibers 210 to generate an electrical signal; and a circuit, which is formed at a periphery of the light reception portion. Similarly, the light-emitting diode 330 also includes a light-emitting portion for generating light, and a circuit formed at a periphery of the light-emitting portion. The light reception portion 321 of the optical sensor chip die 320 receives ambient light incident into the interior of the electronic device 10 and reflected detection light. According to an area occupied by the light reception portion 321 on the optical sensor chip die 320, a position of the light reception portion 321, and/or a distance between the light reception portion 321 and the light-emitting portion, positions at which the other ends 212 of the plurality of optical fibers 210 are configured are different. Hereinafter, it is assumed that a right-side zone of the light reception portion 321 receives the reflected detection light and a left-side zone receives the ambient light. In addition, it is assumed that the vertical arrangement section 240 makes 16 optical fibers 210 to be stacked in three rows (with 5-6-5 optical fibers each row).

FIGS. 7 (a) and (b) show separation structures of exposure ports 153a1 and 153a3 for the optical sensor chip die and exposure ports 153a2 and 153a4 for the light-emitting diode. Herein, a shape of the exposure ports 153a1 and 153a3 for the optical sensor chip die and a shape of the exposure ports 153a2 and 153a4 for the light-emitting diode are only exemplary, and various modifications can be implemented.

In FIG. 7 (a), 15 other ends 212a and 212c are configured in the exposure port 153a1 for the optical sensor chip die, and one other end 212b is configured in the exposure port 153a2 for the light-emitting diode. The other ends 212a emitting ambient light are configured on a left-side of the exposure port 153a1 for the optical sensor chip die, and the other ends 212c emitting reflected detection light are configured on a right-side of the exposure port 153a1. The other end 212b configured at a position corresponding to the light-emitting diode 330 receives the detection light. For example, the optical fiber 210 with the other end 212b can be configured on a leftmost side of a middle row, and the optical fiber 210 with the other end 212c can be configured at a rightmost side of each row.

In FIG. 7 (b), 13 other ends 212a and 212c are configured in the exposure port 153a3 for the optical sensor chip die, and three other ends 212b are configured in the exposure port 153a4 for the light-emitting diode. The other ends 212a emitting ambient light are configured on a left-side of the exposure port 153a3 for the optical sensor chip die, and the other ends 212c emitting reflected detection light are configured on a right-side of the exposure port 153a3. For example, the optical fiber 210 with the other end 212b can be configured on a leftmost side of each row, and the optical fiber 210 with the other end 212c can be configured at a rightmost side of each row.

Figure 8:
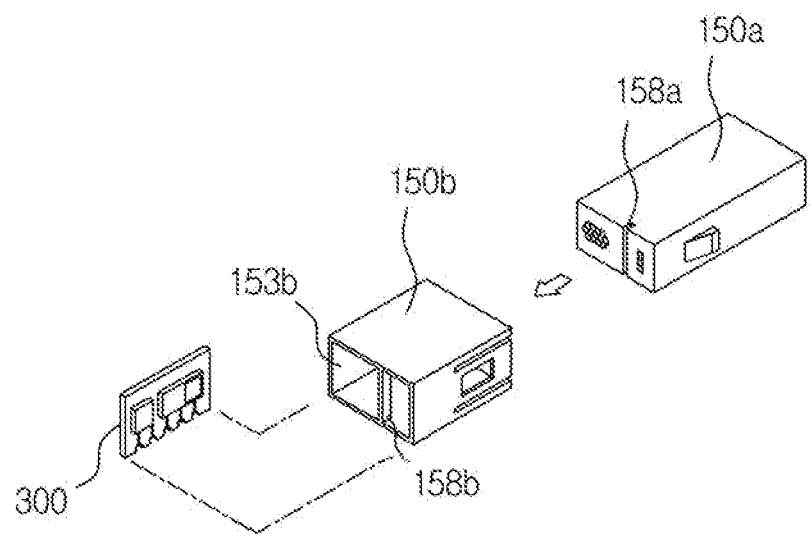
FIG. 8 (*a*) to FIG. 8 (*c*) are diagrams exemplarily showing another embodiment of the sensor connector of the optical sensor assembly.
Figure 8:
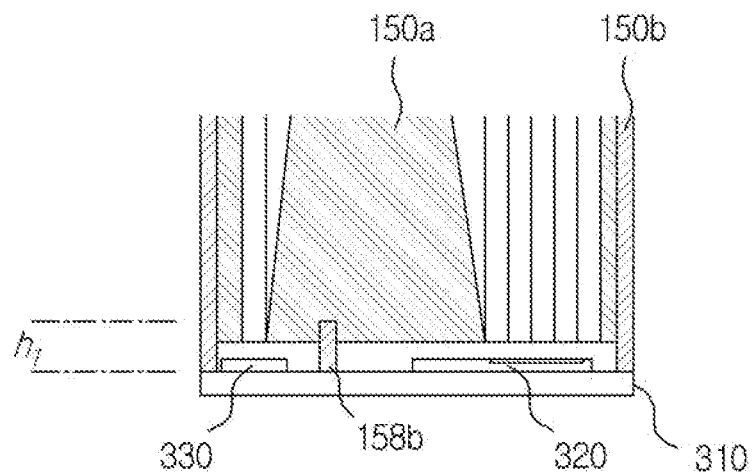
Figure 8:
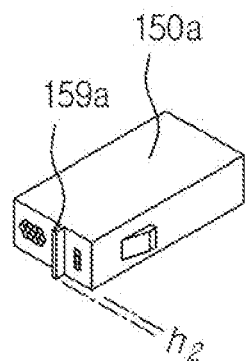

FIG. 8 (a) to FIG. 8 (c) are diagrams exemplarily showing another embodiment of the sensor connector of the optical sensor assembly.

With reference to FIGS. 8 (a) and (b), the optical sensor chip die 320 and the light-emitting diode 330 of the optical sensor 300 are optically separated. FIG. 8 (a) exemplarily shows a structure for optically separating the optical sensor chip die 320 and the light-emitting diode 330 if the male connector 150a is fastened to the female connector 150b, and FIG. 8 (b) exemplarily shows a cross-section of a fastened state of the male connector 150a and the female connector 150b. A separation wall 158b is configured at an exposure port 153b of the female connector 150b. In addition, a separation wall accommodation groove 158a is formed on a front of the male connector 150a. In a structure in which the separation wall accommodation groove 158a is formed, at least a part of the separation wall 158b is accommodated in the separation wall accommodation groove 158a. A height h1 of the separation wall 158b is greater than a thickness of a thicker of the optical sensor chip die 320 and the light-emitting diode 330.

With reference to FIG. 8 (c), the separation wall 159a for optically separating the optical sensor chip die 320 and the light-emitting diode 330 are formed on the front of the male connector 150a. A height h2 of the separation wall 159a is equal to or smaller than a distance between the front of the male connector 150a and the substrate 310 of the optical sensor 300 when the male connector 150a is fastened to the female connector 150b.

Figure 9:
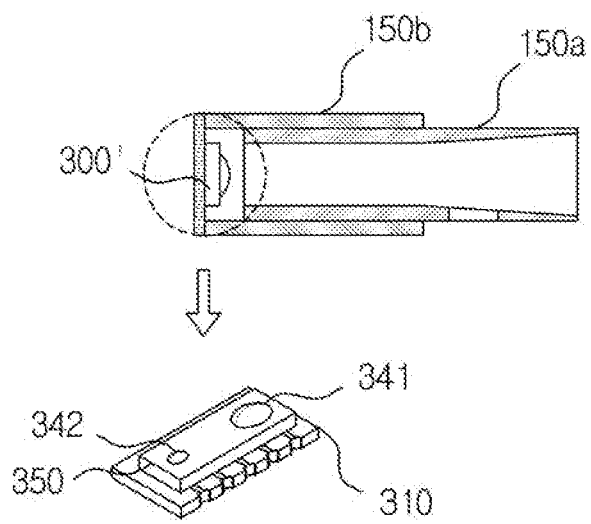
FIG. 9 (*a*) and FIG. 9 (*b*) are diagrams exemplarily showing a structure of an optical sensor of the optical sensor assembly.
Figure 9:
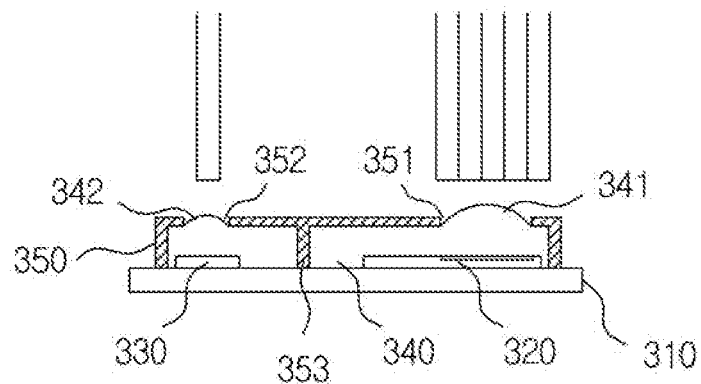

FIG. 9 (a) and FIG. 9 (b) are diagrams exemplarily showing an embodiment of the optical sensor. Compared with the optical sensor 300 shown in FIG. 4 to FIG. 8, the optical sensor 300 shown in FIGS. 9 (a) and 9 (b) further includes a lens 341 formed above the optical sensor chip die 320. In the following description, the lens 341 for the optical sensor and a lens 342 for the light-emitting diode are formed through an identical process. However, the light-emitting diode 330 can be attached to the substrate 310 in a state including a collimating lens, which can be interpreted that lens 342 for the light-emitting diode can be omissible.

With reference to FIGS. 9 (a) and (b), the lens 341 for the optical sensor and the lens 342 for the light-emitting diode are formed above the optical sensor chip die 320 and the light-emitting diode 330 respectively. FIG. 9 (a) exemplarily shows an optical sensor 300' including the lens, and FIG. 9 (b) exemplarily schematically shows a cross section of the optical sensor 300' in a state in which the male connector 150a is fastened to the female connector 150b. A function of the lens 341 for the optical sensor is to increase receiving effects of ambient light emitted from and detection light reflected by the other ends 212. A function of the lens 342 for the light-emitting diode is to improve flatness of detection light generated by the light-emitting diode 330. The lens 341 for the optical sensor and the lens 342 for the light-emitting diode are formed on a lens support body 340. The lens support body 340 is formed, for example, by stacking photocurable epoxy resin on the substrate 310 or 310' according to a predetermined thickness. The lens 341 for the optical sensor and the lens 342 for the light-emitting diode are formed by pressing the photocurable epoxy resin towards a lens mold. The lens support body 340 on which the lens 341 for the optical sensor and the lens 342 for the light-emitting diode are formed can be cured through, for example, ultraviolet rays, etc. A light-shielding shell 350 is formed to wrap around the cured lens support body 340. An opening 351 for the lens for the optical sensor and an opening 352 for the lens for the light-emitting diode are formed on the light-shielding shell 350, such that the lens 341 for the optical sensor and the lens 342 for the light-emitting diode are exposed. In addition, the light-shielding shell 350 further includes a separation wall 353 for optically separating the optical sensor chip die 320 and the light-emitting diode 330.

Figure 10:
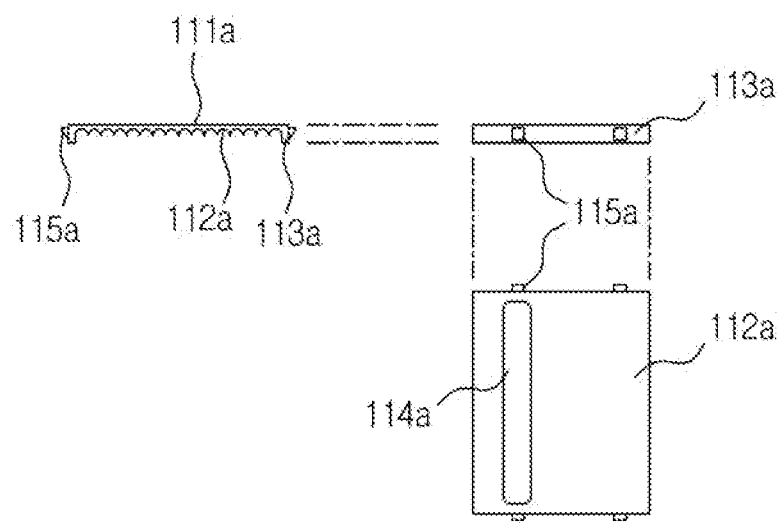
FIG. 10 (*a*) and FIG. 10 (*b*) are diagrams exemplarily showing an embodiment of a flat connector.
Figure 10:
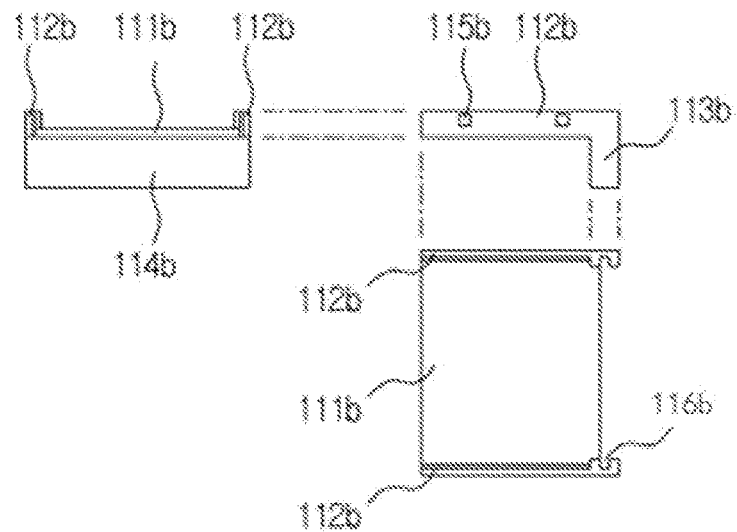

FIG. 10 (a) and FIG. 10 (b) are diagrams exemplarily showing an embodiment of a flat connector, FIG. 10 (a) represents a front, a side and a top of a cover 110a, and FIG. 10 (b) represents a front, a side and a top of a support body 110b.

In FIG. 10 (a), the cover 110a includes an upper plate 111a, and a left side and a right side of the upper plate 111a include side walls 113a extending downwards separately. On a bottom 112a of the upper plate 111a, a plurality of hemispherical grooves are formed, and the plurality of hemispherical grooves accommodate at least a part of the optical fibers 210. An opening 114a that exposes outwards at least a part of the plurality of optical fibers 210, configured between the cover 110a and the support body 110b, is formed in the upper plate 111a. In order to fix the plurality of optical fibers 210, photocurable epoxy resin, etc. is injected into the male connector 150a through the opening 114a. A plurality of fastening bulges 115a which fix the cover 110a to the support body 110b are formed on the side wall 113a.

In FIG. 10 (b), the support body 110b includes a lower plate 111b; upper side walls 112b which are combined to a left side and a right side of the lower plate 111b and extend across the lower plate 111b in a horizontal direction; lower side walls 113b, which extend downwards from extended portions of the upper side walls 112b; and a vertical wall 114b, which extends downwards from the lower plate 111b and connects the lower side walls 113b. The plurality of optical fibers 210 are configured on an upper part of the lower plate 111b. On the upper side wall 112b, a fastening groove 115b is formed at a position corresponding to the fastening bulge 115a. If the cover 110a is inserted between opposite upper side walls 112b, the fastening bulge 115a is accommodated in the fastening groove 115b, and the cover 110a is fastened to the support body 110b. The extended portion of the upper side wall 112b is provided with an insertion groove 116b for inserting a mirror 110c.

Figure 11:
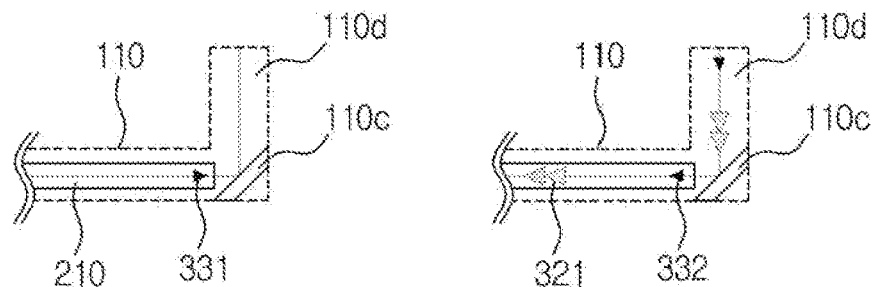
FIG. 11 (*a*) to FIG. 11 (*c*) are diagrams exemplarily showing various embodiments of the flat connector.
Figure 11:
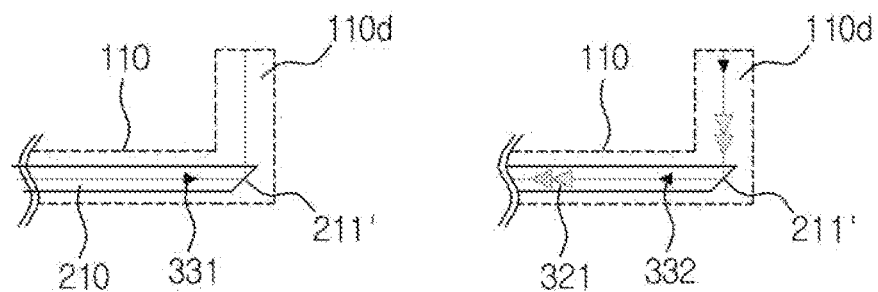
Figure 11:
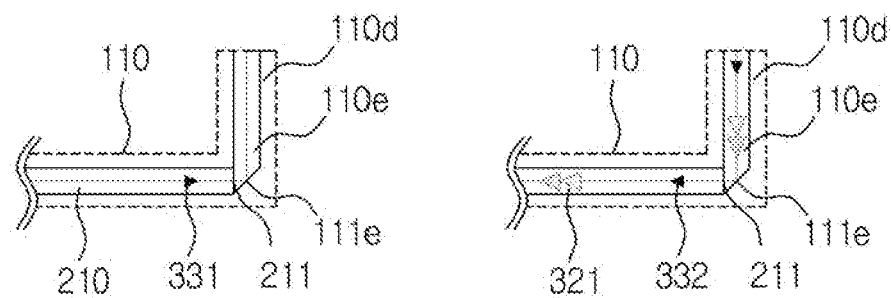

FIG. 11 (a) to FIG. 11 (c) are diagrams exemplarily showing various embodiments of the flat connector.

The flat connector 110 is used for configuring the one ends 211 of a plurality of optical fibers 210, and in order to receive light incident into the electronic device 10, for example, at least a part of the support body 110b is configured between the display panel 13 and the frame 11. A space 110d between the lower side wall 113b and the vertical wall 114b provides a light path, such that light entering the flat connector 110 enters the plurality of optical fibers 210. A traveling direction of light passing through the space 110d is actually perpendicular to a length direction of the optical fibers 210, a structure of changing the traveling direction of light is exemplified in FIGS. 11 (a), 11 (b) and 11 (c).

With reference to FIG. 11 (a), a mirror 110c is shown, and the mirror 110c is configured obliquely at about 45 degrees with respect to the length direction of the optical fibers 210 and the traveling direction of light passing through the space 110. The mirror 110c causes the detection light 331 emitted from the one ends 211 of the optical fibers 210 to be bent about 90 degrees to be directed towards the space 110d. In addition, the mirror 110c causes reflected the detection light 332 and the ambient light 321 entering the space 110d to be bent about 90 degrees to be directed towards the one ends 211 of the optical fibers 210. Herein, the mirror 110c can be replaced with a prism.

With reference to FIG. 11 (b), the one ends 211 of the optical fibers 210 are formed to incline at about 45 degrees, and the one ends 211' is configured towards the cover 110a. The one end 211' obliquely formed is an interface between the optical fibers 210 and air, such that light emitted from the optical fibers 210 is bent towards the space 110d. In addition, the one end 211' causes the reflected detection light 332 and the ambient light 321 entering the space 110d to be bent, such that the reflected detection light and the ambient light enter the optical fibers 210.

With reference to FIG. 11(c), a vertical light guide plate 110e is optically coupled with the one ends 211 of the optical fibers 210. One end of the vertical light guide plate 110e is an inclined plane 111e inclined about 45 degrees, and the inclined plane 111e is configured opposite the one ends 211 of the optical fibers 210. The inclined plane 111e is an interface between the vertical light guide plate 110e and the air, which bends the light and changes the traveling direction. After passing through the interface between the optical fibers 210 and the vertical light guide plate 110e which are optically coupled, the detection light 331 emitted from the optical fibers 210 is bent by the inclined plane 111e to be directed towards the other ends of the vertical light guide plate 110d. In addition, the reflected detection light 332 and the ambient light 321 which are incident from the other ends of the vertical light guide plate 110e are bent by the inclined plane 111e and is directed towards the optical fibers 210.

Figure 12:
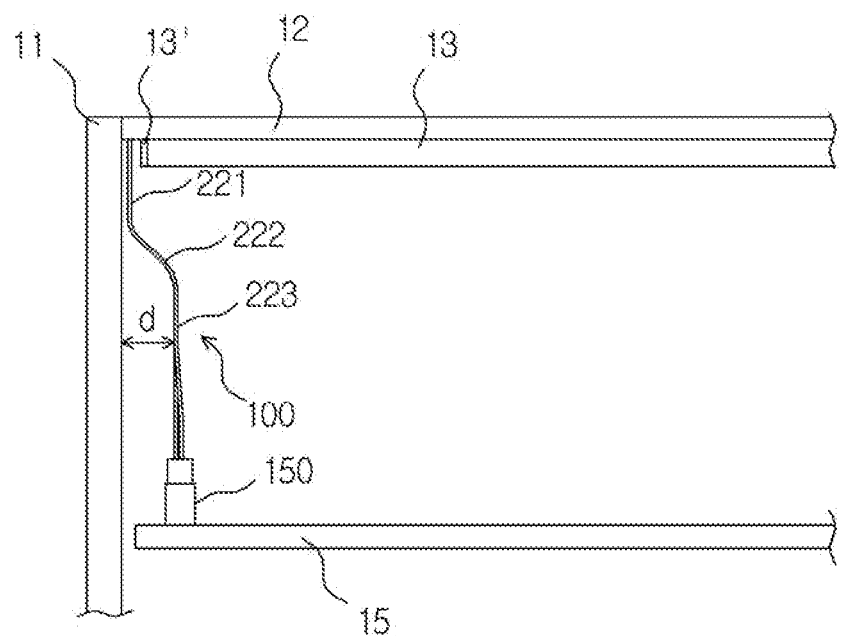
FIG. 12 (*a*) and FIG. 9 (*b*) are diagrams exemplarily showing another embodiment of the optical sensor assembly.
Figure 12:
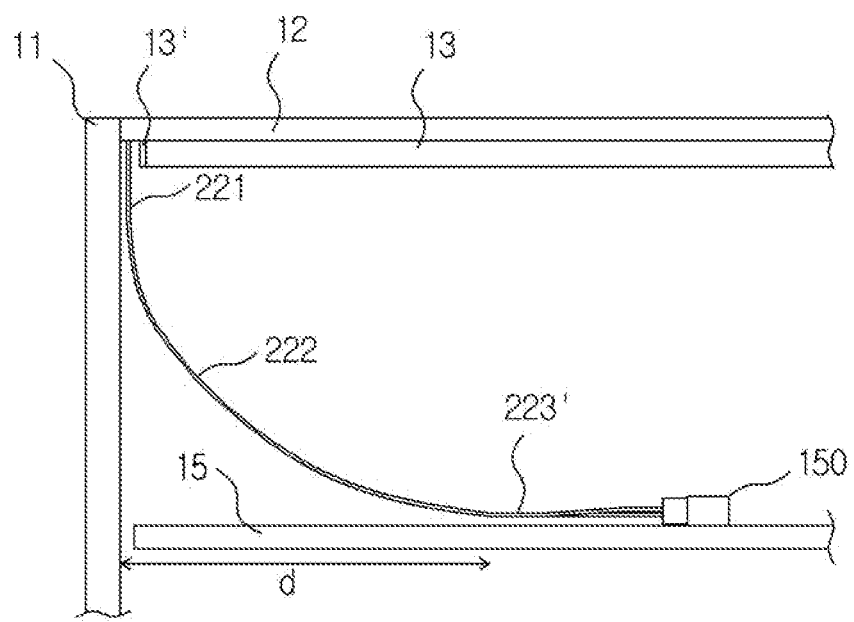

FIG. 12 (a) and FIG. 12 (b) are diagrams exemplarily showing another embodiment of the optical sensor assembly, which shows the optical sensor assembly 100 with a curved horizontal arrangement section.

With reference to FIGS. 12 (a) and 12 (b), at least a part of the horizontal arrangement section 220 is curved. The horizontal arrangement section 220 includes a first linear section 221, a curve section 222 and a second linear section 223. The curve section 222 is arranged between the first linear section 221 and the second linear section 222. The curve section 222 enables one ends 211 of a plurality of optical fibers 210 to be directly optically coupled to a position below the cover glass 12, and the second linear section 222 is separated from the frame 11 of the electronic device 10 by a distance d. Even if there is no curve section 222, the optical sensor assembly 100 can make one ends 211 of the plurality of optical fibers 210 directly optically coupled to the position below the cover glass 12. At this time, the sensor connector 150 is configured in a form of close contact with the frame 11, which may become a new constraint factor for design of the internal structure of the electronic device 10. Therefore, in order to guarantee proper separation distance d from the frame 11 while the plurality of optical fibers 210 are directly combined to the cover glass 12, the curve section 222 is required.

In FIG. 12 (a), the first linear section 221 and the second linear section 223 are actually parallel. Since the distance d is a distance for horizontal separation between the first linear section 221 and the second linear section 223, the sensor connector 150 is separated from the frame 11 through the curve section 222, so as to be configured on a substrate 15 inside the electronic device 10.

In addition, in FIG. 12 (b), the first linear section 221 and the second linear section 223' are actually vertical. The sensor connector 150 is separated from the frame 11 by at least the distance d or a longer distance through the curve section 222, so as to be configured on the substrate 15 inside the electronic device 10.

Figure 13:
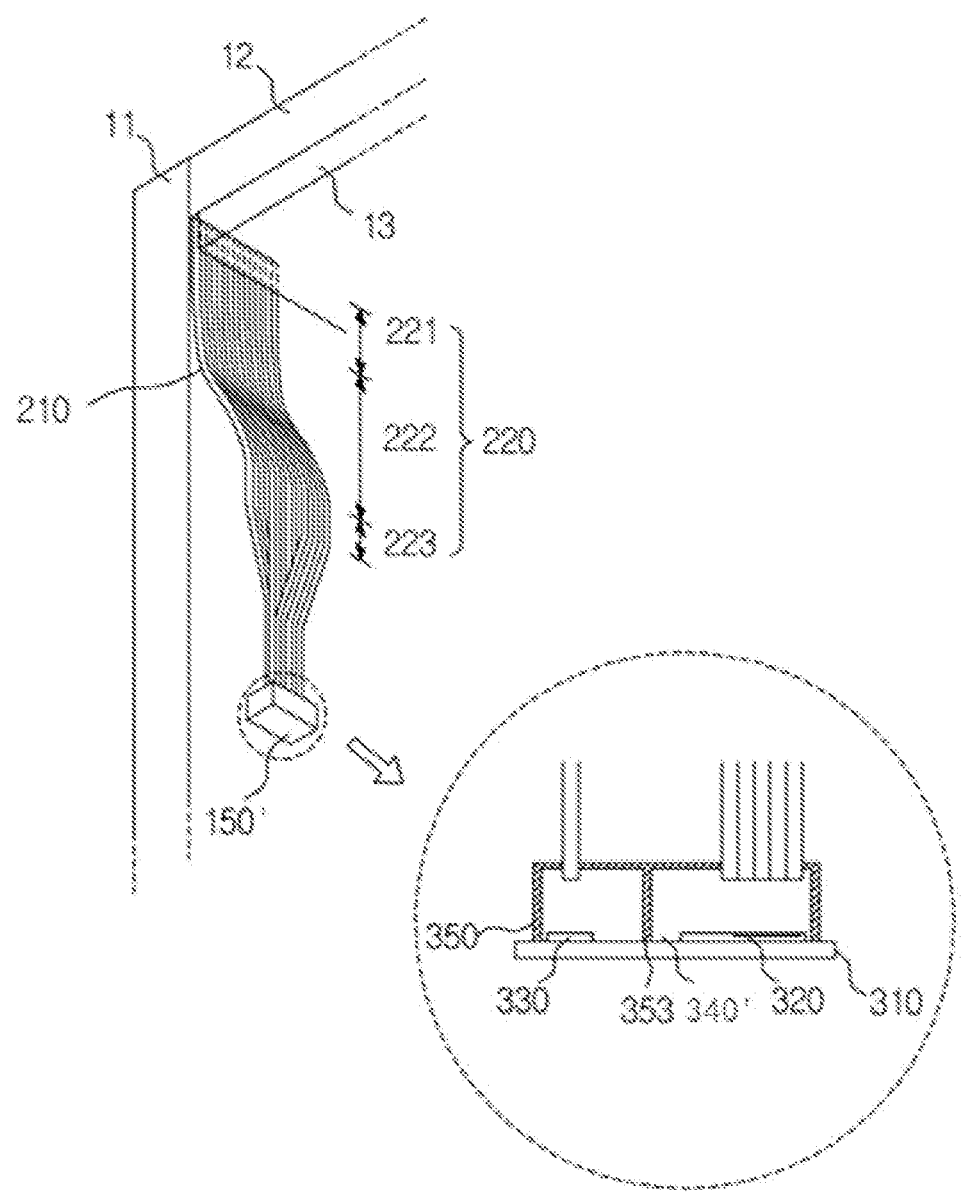
FIG. 13 is a diagram exemplarily showing another embodiment of the optical sensor assembly.

FIG. 13 is a diagram exemplarily showing another embodiment of the optical sensor assembly. In a structure shown in FIG. 13, a sensor connector 150' is integrated with the optical fibers.

The plurality of optical fibers 210 and an optical sensor 300 are optically coupled and integrated. A combination member 340' is formed by stacking an optically transparent material, for example, a photocurable epoxy resin, on the substrate 310 or 310' according to a predetermined thickness, which fixes the other ends of the optical fibers 210 if cured. If at least a part of the optical fiber 210 is inserted into the cured photocurable epoxy resin and then cured by ultraviolet rays, etc. the part of the optical fibers is integrated with the optical sensor 300 through the combination member 340'. The combination member 340' transmits ambient light and/or reflected detection light emitted from the other ends 212 of the optical fibers 210 to the optical sensor chip die 320, and transmits detection light emitted from the light-emitting diode 330 to the other ends 212. The light-shielding shell 350 is formed to wrap around the cured combination member 340'. In addition, the light-shielding shell 350 further includes a separation wall 353 for optically separating the optical sensor chip die 320 and the light-emitting diode 330.

Figure 14:
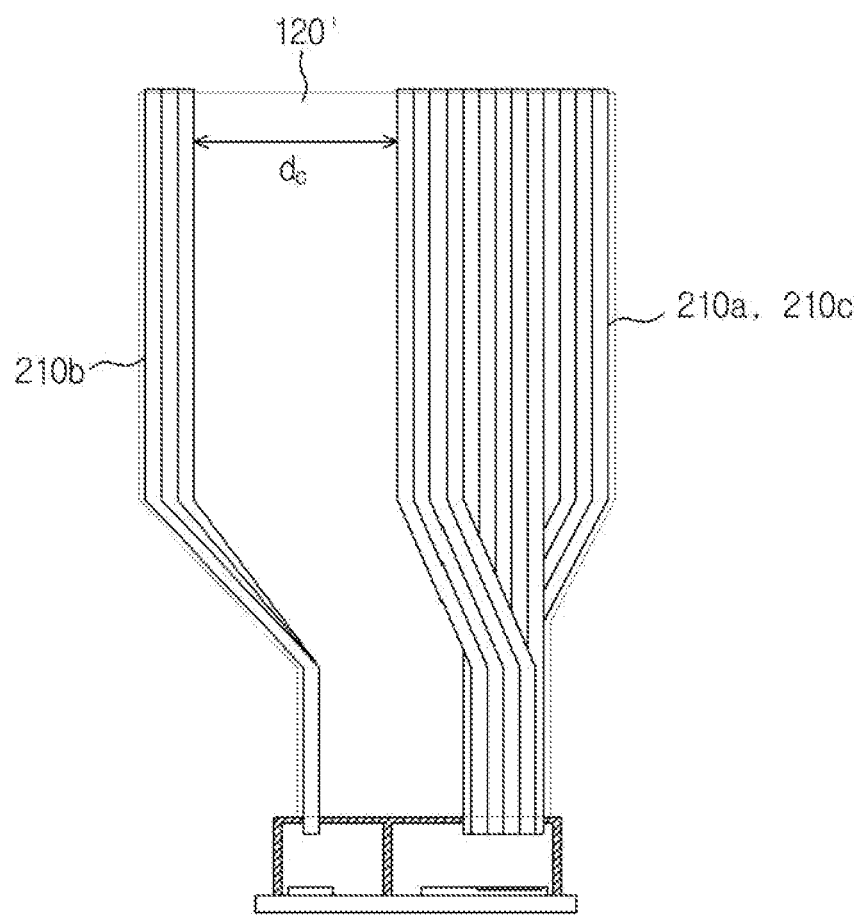
FIG. 14 is a diagram exemplarily showing another embodiment of the optical sensor assembly.

FIG. 14 is a diagram exemplarily showing another embodiment of the optical sensor assembly.

The plurality of optical fibers 210 include an optical fiber 210a for light reception, which transmits ambient light to the optical sensor; an optical fiber 210c for light reception, which transmits reflected detection light to the optical sensor 300; and an optical fiber 210b for light emission, which transmits detection light to an outside. To reduce or prevent crosstalk that may occur between the detection light and the reflected detection light, the optical fiber 210c for light reception and the optical fiber 210b for light emission are configured at a prescribed interval. As an embodiment, as shown in FIG. 14, the optical fibers 210a and 210c for light reception are separated from the optical fiber 210b for light emission at a prescribed distance dc. As another embodiment, as shown, the optical fiber 210c for light reception and the optical fiber 210b for light emission are separated actually at a specified distance through a plurality of optical fibers 210a for light reception configured therebetween. In addition, the optical fibers 210a and 210c for light reception and the optical fiber 210b for light emission is coated with a thermal insulation component 120' formed from a substance with lower thermal conductivity.

The above description of the present disclosure is exemplary, and it should be understood by a person with general knowledge in the technical field of the present disclosure that the embodiments can easily be changed into other specific forms without changing the technical ideas or necessary features of the present disclosure. Therefore, the embodiments described above should be understood as not comprehensive examples and not determinate. Especially, the features of the present disclosure described with reference to the accompanying drawings are not limited to the structure shown in the specific drawings, and can be realized independently or in combination with other features.

Compared with the detailed description, the scope of the present disclosure is embodied in the scope of the following claims, and all modifications or deformation forms derived according to the meanings of the scope and the scope of the claims and their equivalent concepts belong to the scope of the present disclosure.

What is claimed is:

1. An optical sensor assembly, comprising
a plurality of optical fibers, wherein one ends of the plurality of optical fibers are configured in a row, and the other ends of the plurality of optical fibers are stacked in at least two rows, such that a width of a first surface formed by the one ends of the plurality of optical fibers is greater than a width of a second surface formed by the other ends of the plurality of optical fibers; and
a sensor connector optically coupled with the second surface,
wherein the first surface receives light incident into an interior of an electronic device, and the light received by the first surface is transmitted to the sensor connector through the second surface,
and the sensor connector is able to be separated from the first surface and configured inside the electronic device;
wherein the plurality of optical fibers comprise:
a horizontal arrangement section, which configures the one ends of the plurality of optical fibers in a row;
a vertical arrangement section, which configures the other ends of the plurality of optical fibers in at least two rows; and
a deformation section, which connects the horizontal arrangement section and the vertical arrangement section and bends the plurality of optical fibers.

2. The optical sensor assembly as claimed in claim 1, wherein
the plurality of optical fibers are plastic optical fibers (POF).

3. The optical sensor assembly as claimed in claim 1, wherein
in the second surface, the other ends of the optical fibers are stacked with a same number in each of the rows.

4. The optical sensor assembly as claimed in claim 1, wherein
in the second surface, the other ends of the optical fibers are stacked in at least two rows, and a number of the other ends of the fibers stacked in at least any one of the rows is different from a number of the other ends of the fibers stacked in each of the other rows.

5. The optical sensor assembly as claimed in claim 1, wherein
the second surface is provided with a plurality of regions.

6. The optical sensor assembly as claimed in claim 1, wherein
a length of the horizontal arrangement section is longer than a length of the vertical arrangement section and a length of the deformation section;
the first surface is configured in a space between a frame of the electronic device and a display panel.

7. The optical sensor assembly as claimed in claim 1, wherein the sensor connector comprises:
a male connector, which is used for the other ends of the plurality of optical fibers to be inserted and fixed inwards;
a female connector, which is used for accommodating the male connector inside; and
an optical sensor, which is coupled with the female connector in a direction towards the male connector.

8. The optical sensor assembly as claimed in claim 7, wherein the optical sensor comprises:

a substrate, a side of the substrate being arranged a plurality of cut-off through holes;
an optical sensor chip die, which is configured on the substrate and electrically connected with the plurality of cut-off through holes; and
a light-emitting diode, which is configured on the substrate and separated from the optical sensor chip die and electrically connected with the plurality of cut-off through holes.

9. The optical sensor assembly as claimed in claim 8, wherein
the female connector further comprises a separation wall for optically separating the optical sensor chip die and the light-emitting diode.

10. The optical sensor assembly as claimed in claim 8, wherein
the male connector further comprises a separation wall for optically separating the optical sensor chip die and the light-emitting diode.

11. The optical sensor assembly as claimed in claim 8, wherein
the optical sensor further comprises an optical sensor lens arranged above the optical sensor chip die.

12. The optical sensor assembly as claimed in claim 1, wherein
the optical sensor assembly further comprises a flat connector, the flat connector accommodating the one ends of the plurality of optical fibers inside,
the flat connector being capable of providing a light path, and the light path causing the light incident into the interior of the electronic device to travel towards the one ends.

13. The optical sensor assembly as claimed in claim 12, wherein the flat connector comprises:
a cover, which is internally provided with a hemispherical groove, the hemispherical groove accommodating at least a part of the optical fibers; and
a support body, which is provided with the plurality of optical fibers and fastened to the cover, so as to fix the plurality of optical fibers.

14. The optical sensor assembly as claimed in claim 12, wherein
the optical sensor assembly further comprises a mirror, the mirror being configured obliquely with respect to the plurality of optical fibers and the light path separately.

15. The optical sensor assembly as claimed in claim 12, wherein
the one ends of the plurality of optical fibers are inclined planes.

16. The optical sensor assembly as claimed in claim 12, wherein
the optical sensor assembly further comprises a vertical light guide plate, the vertical light guide plate being configured in the light path, so as to optically couple with the one ends of the plurality of optical fibers, and inclined planes are configured opposite the one ends of the optical fibers.

17. The optical sensor assembly as claimed in claim 1, wherein
the optical sensor assembly further comprises a thermal insulation component, the thermal insulation component protecting the plurality of optical fibers.

18. The optical sensor assembly as claimed in claim 1, wherein the plurality of optical fibers comprise:
an optical fiber for light emission, which transmits detection light to an outside; and an optical fiber for light reception, which transmits reflected detection light incident from the outside, the optical fiber for light emission and the optical fiber for light reception being configured separately.

* * * * *